United States Patent
Telefus

(10) Patent No.: US 7,826,873 B2
(45) Date of Patent: Nov. 2, 2010

(54) CONTACTLESS ENERGY TRANSMISSION CONVERTER

(75) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 586 days.

(21) Appl. No.: 11/810,917

(22) Filed: Jun. 6, 2007

(65) Prior Publication Data

US 2007/0287508 A1    Dec. 13, 2007

Related U.S. Application Data

(60) Provisional application No. 60/812,652, filed on Jun. 8, 2006.

(51) Int. Cl.
*H04B 1/38* (2006.01)
*H04M 1/00* (2006.01)

(52) U.S. Cl. ............ 455/573; 455/41.1; 455/41.2; 455/17; 455/59; 340/10.1; 340/10.3; 340/10.34; 320/108; 320/112; 320/114

(58) Field of Classification Search ........... 455/41.1, 455/41.2, 23, 113, 59, 61, 573, 17; 340/10.1, 340/10.3, 10.34; 320/108, 112, 114, 115

See application file for complete search history.

(56) References Cited

U.S. PATENT DOCUMENTS

| | | | |
|---|---|---|---|
| 2,415,688 A | 2/1947 | Hall, Jr. ............ 219/25 |
| 2,483,815 A | 10/1949 | Easton ............ 175/356 |
| 2,967,267 A | 1/1961 | Steinman et al. ............ 317/101 |
| 3,277,358 A | 10/1966 | Nicholl ............ 320/59 |
| 3,292,579 A | 12/1966 | Buchanan ............ 119/5 |
| 3,329,880 A | 7/1967 | Boyles ............ 320/2 |
| 3,418,552 A | 12/1968 | Holmes ............ 320/2 |
| 3,549,990 A | 12/1970 | Hochheiser ............ 323/44 |
| 3,641,336 A | 2/1972 | Boin ............ 240/10.6 R |
| 3,663,954 A * | 5/1972 | Alker ............ 324/620 |
| 3,772,625 A | 11/1973 | Raupach ............ 336/94 |
| 3,840,795 A | 10/1974 | Roszyk et al. ............ 320/2 |
| 3,885,211 A | 5/1975 | Gutai ............ 320/2 |
| 3,938,018 A | 2/1976 | Dahl ............ 320/2 |
| 3,939,391 A | 2/1976 | Winnacker ............ 320/2 |
| 3,988,604 A * | 10/1976 | Raymond, Jr. ............ 708/190 |

(Continued)

FOREIGN PATENT DOCUMENTS

WO    WO 2005/122377 A1    12/2005

OTHER PUBLICATIONS

"Electromagnetic Fields," Consumer Reports, May 1994, pp. 354-359.

(Continued)

*Primary Examiner*—Tuan A Pham
(74) *Attorney, Agent, or Firm*—Haverstock & Owens LLP

(57) ABSTRACT

The present invention is an efficient method of transferring energy wirelessly and an apparatus which efficiently transfers energy wirelessly. A high transmission frequency is modulated by a lower frequency in order to reduce the intensity of the resulting electromagnetic interference. The present invention creates a high magnetic flux density by employing a large number of small induction coils which generates a strong electromagnetic field in a wide range of directions. The present invention is a "true wireless system" in that it overcomes the range limitations and requirement for precise alignment present in the field of art. A number of apparatuses and practical implementations for contactless energy transfer exist.

22 Claims, 10 Drawing Sheets

U.S. PATENT DOCUMENTS

| | | | |
|---|---|---|---|
| 4,030,058 A | 6/1977 | Riffe et al. ..................... 336/92 |
| 4,038,625 A | 7/1977 | Tompkins et al. ............. 336/83 |
| 4,146,857 A | 3/1979 | Schleupen ................... 336/61 |
| 4,260,943 A | 4/1981 | Zaderej et al. ................ 320/21 |
| 4,303,902 A | 12/1981 | Lesster et al. ................. 336/83 |
| 4,496,896 A | 1/1985 | Melocik et al. ................ 320/2 |
| 4,543,556 A | 9/1985 | Taylor et al. ............... 336/210 |
| 4,654,573 A | 3/1987 | Rough et al. ................... 320/2 |
| 4,800,328 A | 1/1989 | Bolger et al. .................. 320/2 |
| 4,827,550 A | 5/1989 | Graham et al. .............. 15/22 R |
| 4,827,551 A | 5/1989 | Maser et al. .................... 15/24 |
| 4,827,552 A | 5/1989 | Bojar et al. ..................... 15/28 |
| 4,845,795 A | 7/1989 | Crawford et al. ............. 15/22 R |
| 4,845,796 A | 7/1989 | Mosley ........................... 15/23 |
| 4,893,227 A | 1/1990 | Gallios et al. ................. 363/26 |
| 4,901,069 A | 2/1990 | Veneruso .................... 340/853 |
| 4,912,391 A | 3/1990 | Meadows ....................... 320/2 |
| 4,942,352 A | 7/1990 | Sano .............................. 320/2 |
| 5,070,293 A | 12/1991 | Ishii et al. ....................... 320/2 |
| 5,157,319 A | 10/1992 | Klontz et al. .................. 320/2 |
| 5,216,402 A | 6/1993 | Carosa ......................... 336/66 |
| 5,264,776 A | 11/1993 | Hulsey ........................... 320/2 |
| 5,498,948 A | 3/1996 | Bruni et al. |
| 5,590,214 A * | 12/1996 | Nakamura .................. 381/182 |
| 5,673,185 A | 9/1997 | Albach et al. |
| 5,811,895 A | 9/1998 | Suzuki et al. ............... 307/125 |
| 5,850,181 A | 12/1998 | Heinrich et al. ............. 340/572 |
| 5,923,543 A | 7/1999 | Choi ............................ 363/21 |
| 5,986,600 A * | 11/1999 | McEwan ..................... 342/28 |
| 6,040,680 A | 3/2000 | Toya et al. |
| 6,127,799 A | 10/2000 | Krishnan |
| 6,437,549 B1 * | 8/2002 | Takagishi ................... 323/282 |
| 6,469,241 B1 | 10/2002 | Penn ........................... 136/246 |
| 6,548,985 B1 | 4/2003 | Hayes et al. |
| 6,578,253 B1 | 6/2003 | Herbert ....................... 29/605 |
| 6,906,495 B2 | 6/2005 | Cheng et al. |
| 6,972,543 B1 | 12/2005 | Wells |
| 7,164,255 B2 * | 1/2007 | Hui ............................ 320/108 |
| 2002/0011823 A1 | 1/2002 | Lee ............................. 320/137 |
| 2002/0011922 A1 * | 1/2002 | Wuidart ...................... 340/10.4 |
| 2003/0035303 A1 | 2/2003 | Balakrishnan et al. ......... 363/16 |
| 2004/0105364 A1 | 6/2004 | Chow et al. .............. 369/47.19 |
| 2004/0126932 A1 | 7/2004 | Ito et al. ...................... 438/123 |
| 2005/0156563 A1 | 7/2005 | Lin et al. |
| 2005/0275629 A1 | 12/2005 | Chin |
| 2005/0286660 A1 | 12/2005 | Nysen et al. ................. 375/343 |
| 2006/0022636 A1 * | 2/2006 | Xian et al. ................... 320/108 |
| 2006/0055620 A1 | 3/2006 | Oliver et al. ................ 343/876 |
| 2006/0196642 A1 | 9/2006 | Gharib et al. .......... 165/104.28 |
| 2007/0012353 A1 | 1/2007 | Fischer et al. ............... 136/251 |

OTHER PUBLICATIONS

"Exposure to Residential Electric and Magnetic Fields and Risk of Childhood Leukemia," University of Southern California, Electric Power Research Institute EN-7464, Project 2964-1, Interim Report (Report Summary only), Nov. 1991.

"Exploring the Options for Magnetic Field Management," EPRI Journal, Oct./Nov. 1990, pp. 5-19.

Gordon Miller, "Exposure Guidlines for Magnetic Fields," American Industrial Hygiene Association Journal, Dec. 1987, vol. 48, pp. 957-968.

J. R. Gauger, "Household Appliance Magnetic Field Survey," IEEE Transactions on Power Apparatus and Systems, Sep. 1985, vol. PAS-104, No. 9.

Hang-Seok Choi et al., Novel Zero-Voltage and Zero-Current-Switching (ZVZCS) Full-Bridge PWM Converter Using Coupled Output Inductor, Sep. 2002 IEEE, pp. 641-648.

"Design of a Contactless Battery Charger for Cellular Phone", Chang-Gyun Kim et al., IEEE APEC '00, vol. 2, 2000, pp. 769-773.

* cited by examiner $\omega = \omega_{high}$ $\omega = \omega_{square}$ $\omega = \omega_{mod}$

CONTACTLESS ENERGY TRANSMISSION CONVERTER

RELATED APPLICATIONS

This application claims priority under 35 U.S.C. section 119(e) of co-pending U.S. Provisional Patent Application No. 60/812,652, filed Jun. 8, 2006, and entitled "Contactless Energy Transmission Converter," which is hereby incorporated by reference.

FIELD OF THE INVENTION

The present invention relates generally to the transfer of power without the use of a wires. More particularly, the present invention is directed to the inductive transfer of energy achieved by high-frequency operation and low radiated electromagnetic emission power.

BACKGROUND

Household portable electronics, cellular phones and personal digital assistants, MP3 players, digital cameras and many other portable electronic devices are common consumer products. One attribute these consumer electronics share is the need to power and charge the batteries within the devices. Typically, each device is designed and built with its own unique power cell and charging adaptor or device. The charging adaptors typically run on electricity from an electrical outlet, a car cigarette lighter or from another suitable power supply wired to the device using a connector. Memory devices have a propriety connector. These methods of power transfer can be efficient, however, they also pose many problems.

First, current power transfer systems require a person to own and organize many rechargers or adaptors. Typically, both the power cells and the geometry of the device charging connectors are different depending on the size of the device, the charging voltage and the manufacturer of the device. The various chargers required to charge a collection of devices take up a lot of physical space and it can be difficult to remember which charger goes with which device.

Present solutions to charging consumer electronic devices can be messy, inconvenient and potentially dangerous. Consumer electronics chargers are typically plugged into common 120 or 240 volt wall sockets. It is often times desirable to charge several in one place to localize the mess of tangled cords and to provide convenience in locating a particular device. However, doing forces a user to use unsightly and potentially dangerous power strips and also to untangle and manage the various cords.

Another problem exists when trying to charge electrical devices where there is potential for water to come into contact with the device. Water corrodes metal coupling fixtures and can create electrical shorts. Electronics in the bathroom, such as electrical shavers and toothbrushes are especially prone to shorts. Likewise, charging devices near a pool, in a kitchen, outside or near another source of water can potentially ruin the device, or injure a user if the device or the charger gets wet and damaged.

Some inductive charging devices exist, but require the user to position the target device in some particular orientation on a charger which is burdensome and time consuming. Others waste a large amount of power to open space or are not powerful enough to conveniently charge modern devices.

Past attempts to use inductance to transfer power without requiring the precise orientation of the transducer and receiver has been proposed, but such attempts are so inefficient as to be not feasible. The principle drawback to such proposed charging systems is the amount of emitted Electro-Magnetic Interference (EMI) which is radiated into free space from such devices. To charge a remote device via remote inductive coupling requires a powerful signal to create adequate current flow in the target receiver. Such a signal is usually transmitted at one frequency, causing a strong spectral density of energy at that frequency and a large amount of radiated EMI. In reality, a monotonal signal cannot easily be produced, and typically a signal is formed with a distribution of frequencies, and harmonies centered upon the desired frequency. Therefore, EMI radiation from a powerful signal will interfere with the chosen frequency and a number of frequencies in close proximity to the radiated frequency.

ElectroMagnetic Interference (EMI) interrupts, obstruct, or otherwise degrades the performance of other circuitry. For example, EMI radiation can manifest itself as visual disturbances in visual devices such as televisions or computer monitors, or as audio disturbances in auditory devices such as radios. EMI radiation of particular frequencies are able to interrupt other signals, causing them to fail. For instance, interference around the 2.40 Ghz band is able to cause typical IEEE 802.11 Wi-Fi applications to fail. Furthermore, evidence exists that suggests that EMI can be harmful to human health.

SUMMARY OF THE DISCLOSURE

The present invention discloses an efficient method to transfer energy wirelessly. The present invention is a "true wireless system" in that it overcomes the range limitations and requirement for precise alignment present in the field of art. Also, an apparatus efficiently transfers energy wirelessly. A energy transmitting unit coverts a current to a wireless signal. The target unit comprises an inductive antenna which inductively converts a signal into a current. The current converted by the target is able to be used by the target to directly operate the target circuitry or to charge a battery in the target unit. It is preferable to align a number of inductive antennas in the target unit, thus avoiding the need to carefully align the target unit with the energy transmitting unit. The present invention creates a high magnetic flux density by employing a large number of small induction coils which generates a strong electromagnetic field in a wide range of directions.

Practical parameters, such as interference with other electronics, as well as environmental regulations limit the amount of electromagnetic interference (EMI) that is allowed to be produced by such a system. Therefore, the transmitter of the present invention transmits a powerful signal at a high frequency modulated by a lower frequency carrier signal to spread out the frequency of the radiated EMI and decreasing its intensity. Such modulation is achieved using controllable transistor pairings which frame the high frequency signal within a low frequency waveform.

In some embodiments of the present invention the high frequency signal is modulated by a constant low frequency square wave pulse train. In other embodiments of the present invention, the high frequency signal is modulated by a dynamic low frequency square wave. In still other embodiments of the present invention, the high frequency signal is modulated by a second randomly chosen, low frequency waveform.

A number of apparatuses and practical implementations for contactless energy transfer exist. Among them is a transmitter in a computer mouse pad and a target receiver with an induction coil in a wireless computer mouse and a charging device for charging multiple consumer electronic devices. Another implementation is a transmitter pad to inductively charge television, cable and stereo remote controls. Other applications include toys, flashlights, cellular telephones, music players, personal digital assistants and other battery powered devices.

BRIEF DESCRIPTION OF THE DRAWINGS

The novel features of the invention are set forth in the appended claims. However, for the purpose of explanation, several embodiments of the invention are set forth in the following figures:

DETAILED DESCRIPTION

Embodiments of the present invention are directed to a method, apparatus, and example applications for wireless transmission of energy. Those of ordinary skill in the art will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the present invention as illustrated in the accompanying drawings. The same reference indicators will be used throughout the drawings and the following detailed description to refer to the same or like parts.

The present invention wirelessly transfers energy from a source unit to a target unit. The source unit converts a current into a wireless signal. Preferably the source unit is coupled to a power source. The target unit is comprised of induction coils which generate electromagnetic fields, to pick up the signal and convert the signal into a current. The present invention is a "true wireless system" in that it overcomes limitation of both traditional electromagnetic inductance methods and radio wave transmission methods.

Figure 1A:
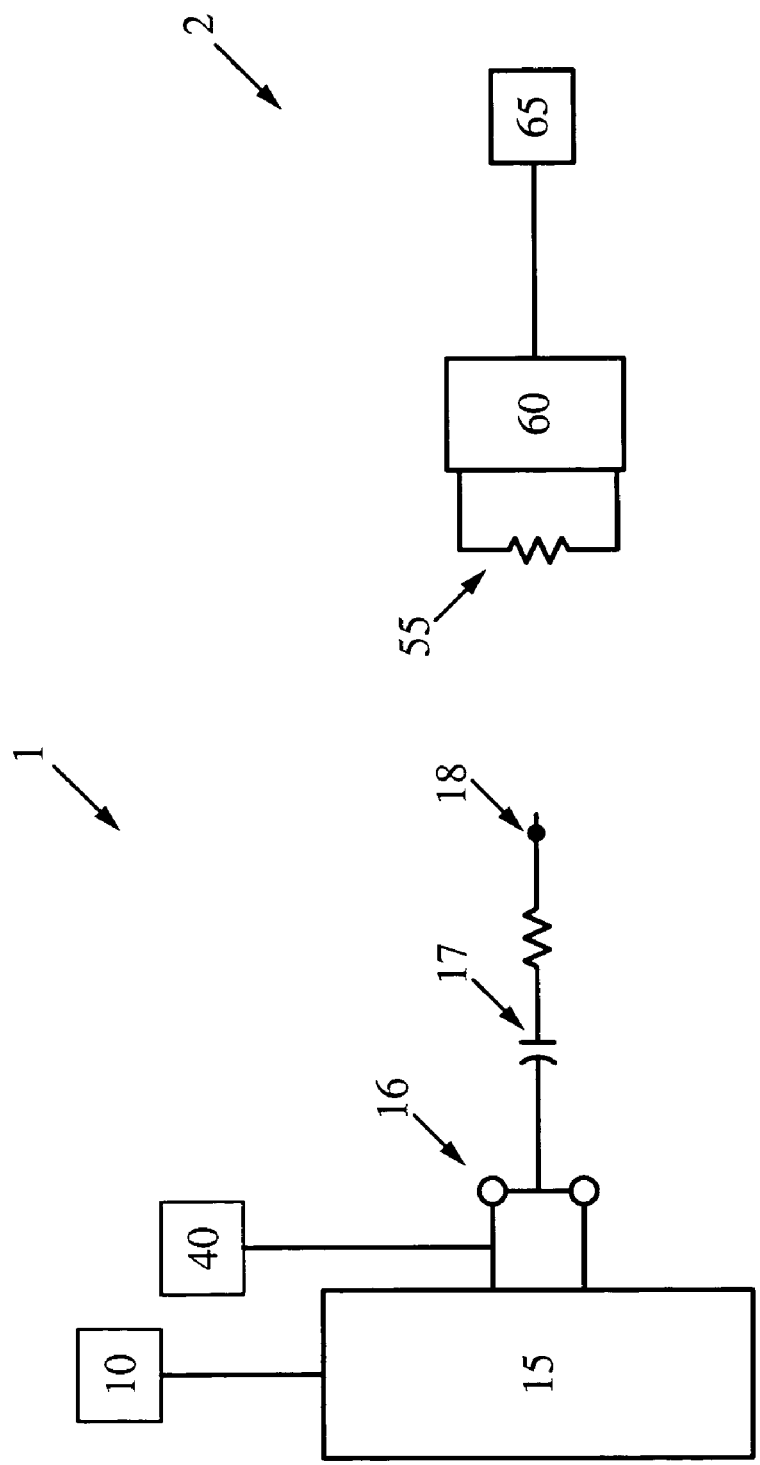
FIG. 1A is a schematic diagram of a contactless energy transmitter of the present invention.

FIG. 1A illustrates the contactless energy transmission converter according to some embodiments of the present invention. In FIG. 1A, the transmitter 1 is configured to use a current to produce a wireless energy signal, and the receiver 2 is configured to convert the wireless energy signal into a current and charge a battery 65. As shown, a power source 10 is coupled to a multiphase transmitter 15. The multiphase transmitter 15 is coupled to a transistor pair 16 and the transistor pair 16 is coupled to controller 40. A current emitted from the transistor pair 16 is further coupled to a capacitor 17 which in turn is coupled to a transmission antenna 18.

The contactless energy transmission converter operates when the power source 10 supplies current to a multiphase transmitter 15 which produces a first signal having a first frequency. The first signal is coupled to the transistor pair 16. The controller 40 controls when the transistor pair 16 is turned "on" and turned "off". When the transistor pair is "on", the first signal is allowed through the transistor pair 16 and when the transistor pair 16 is turned "off" the signal does not go through. As such, the controller 40 is able to produce a square wave packet having a low frequency wherein the square wave packet frames the first signal having a first frequency, thus modulating the first signal. This modulated signal is then transmitted by the transmission antenna 18. The transmission antenna 18 transmits the signal to the reception antenna 55 of the receiver 2. The reception antenna 55 is coupled to a DC-Converter 60 which converts the signal into a DC current. The DC current is then used to charge the battery 65.

The modulation of the first signal results in an energy distribution having much less ElectroMagnetic Interference (EMI) centered at the frequency of the first signal. Reducing the effective EMI strength allows such an energy transferring system to be used in modern applications where EMI levels must be low for practical, safety or regulatory reasons. The modulation of the first signal resulting in an energy distribution having a lower Electromagnetic Interference is illustrated in more detail below when referring to FIGS. 3A-3C.

In other embodiments of the present invention, the controller 40 produces a dynamic modulation frequency. Preferably, the dynamic modulation frequency is less than 50 kilohertz. This dynamic frequency can also be random or pseudo-random. A randomly formed modulation frequency further limits the strength to the radiated EMI.

Figure 1B:
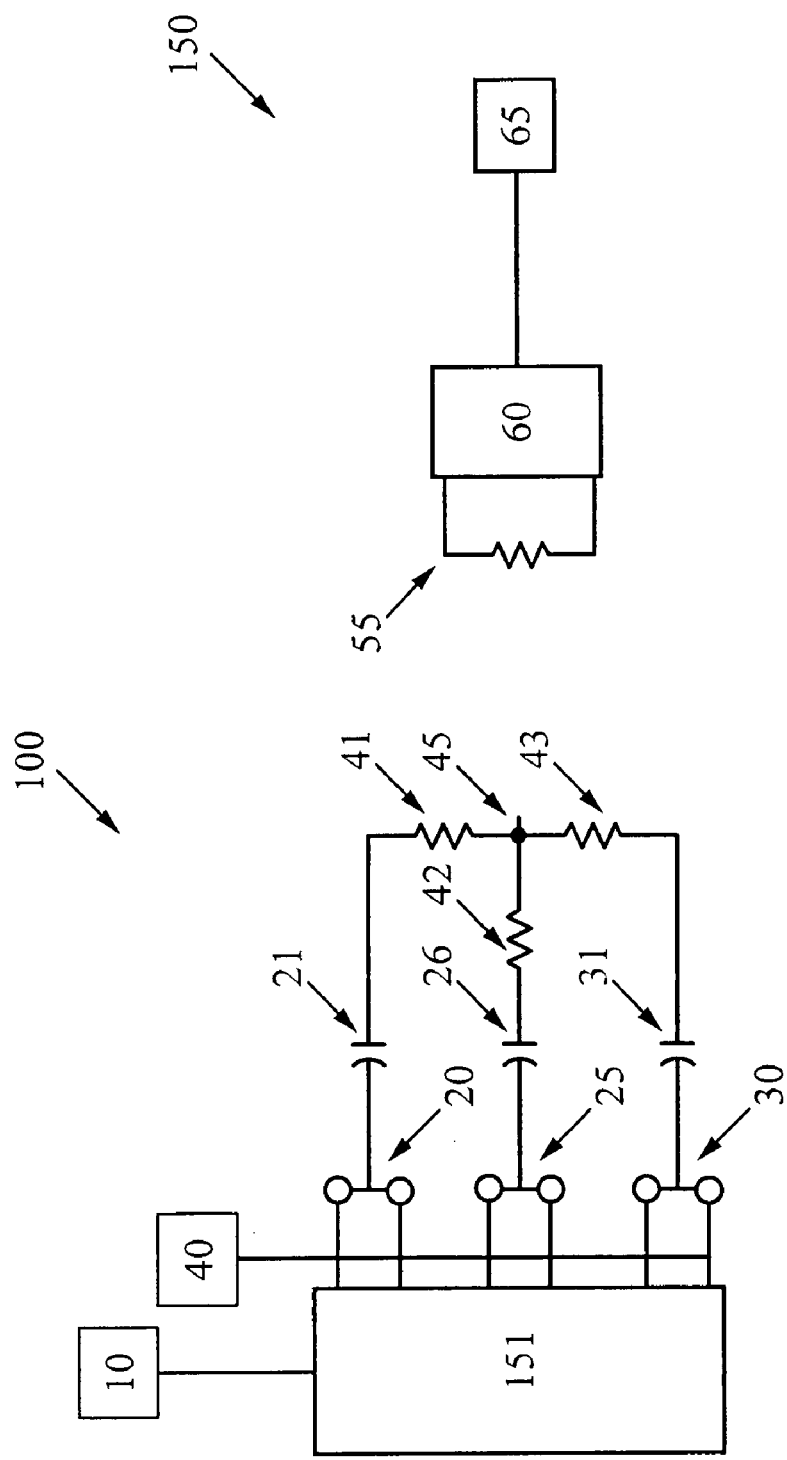
FIG. 1B is a schematic diagram of an alternative contactless energy transmitter of the present invention.

FIG. 1B is a schematic diagram of the contactless energy transmitter 100 and a receiver 150 according to other embodiments of the present invention. A multiphase transmitter 151 is coupled to some power source 10. The multiphase transmitter 151 produces a signal frequency. In preferred embodiments of the present invention, this signal frequency is a very high transmitting frequency on the order of 500 kilohertz. Three groups of complementary pairs of transistors 20, 25, 30 are coupled to the multiphase transmitter 151. Preferably, the type of individual transistors are selected among transistors which will not produce a signal with a DC-bias. The pairs of transistors 20, 25, 30 are coupled to the controller 40. Each complementary pair of transistors are coupled to an inductor 41, 42, and 43 respectively. The inductors 41, 42, and 43 are coupled together and comprise an antenna 45.

The multiphase transmitter 151 transmits a signal with some high frequency $\omega_{high}$ to the pairs of transistors 20, 25, 30. The pairs of transistors 20, 25 and 30 are controlled by the controller 40 to alternatively turn on and off to create a packet frame wave. Preferably, the packet frame wave is a square wave. For example, when transistor 20 is turned on, transistors 25 and 30 are off. Then, transistor 20 is turned off, transistor 30 remains off and 25 is turned on. Next, 25 is turned off, 20 remains off and 30 is turned on. The individual transistors in the pairs of transistors 20, 25, 30 are chosen such that one transistor in the pair controls the rising part of the square waveform signal and the other transistor controls the falling part of the square waveform signal. The square wave signal transmitted from the transmitter and controlled by the transistors 20, 25, 30 is further controlled by the capacitors 21, 26, 31.

The transistors 20, 25 and 30 are turned on and off to modulate the high frequency $\omega_{high}$ by switching the transistors on and off at some lower frequency $\omega_{square}$. When a given transistor pair is operating, it allows the signal with a frequency $\omega_{high}$ to pass through and when it is turned off, the frequency $\omega_{high}$ is cut off. The end product is a signal with a frequency $\omega_{mod}$, comprising a high frequency $\omega_{high}$ modulated by a square wave with a frequency $\omega_{mod}$. Again, the signal produced by the multiphase transmitter 151 and modulated by the transistor pair 20, 25 and 30 is transmitted by the transmission antenna 45, resulting in a transmission signal with smaller effective EMI. The transmission signal is received by the reception antenna 55 of the receiver 150. The reception antenna 55 is coupled to a DC-Converter 60 which converts the signal into a DC current. The DC current is then used to charge a battery 65.

In other embodiments of the present invention, the controller 40 produces a dynamic modulation frequency. Preferably, the dynamic modulation frequency is less than 50 kilohertz. This dynamic frequency can also be random or pseudo-random. A randomly created modulation frequency further limits the effective strength of the radiated EMI.

Figure 1C:
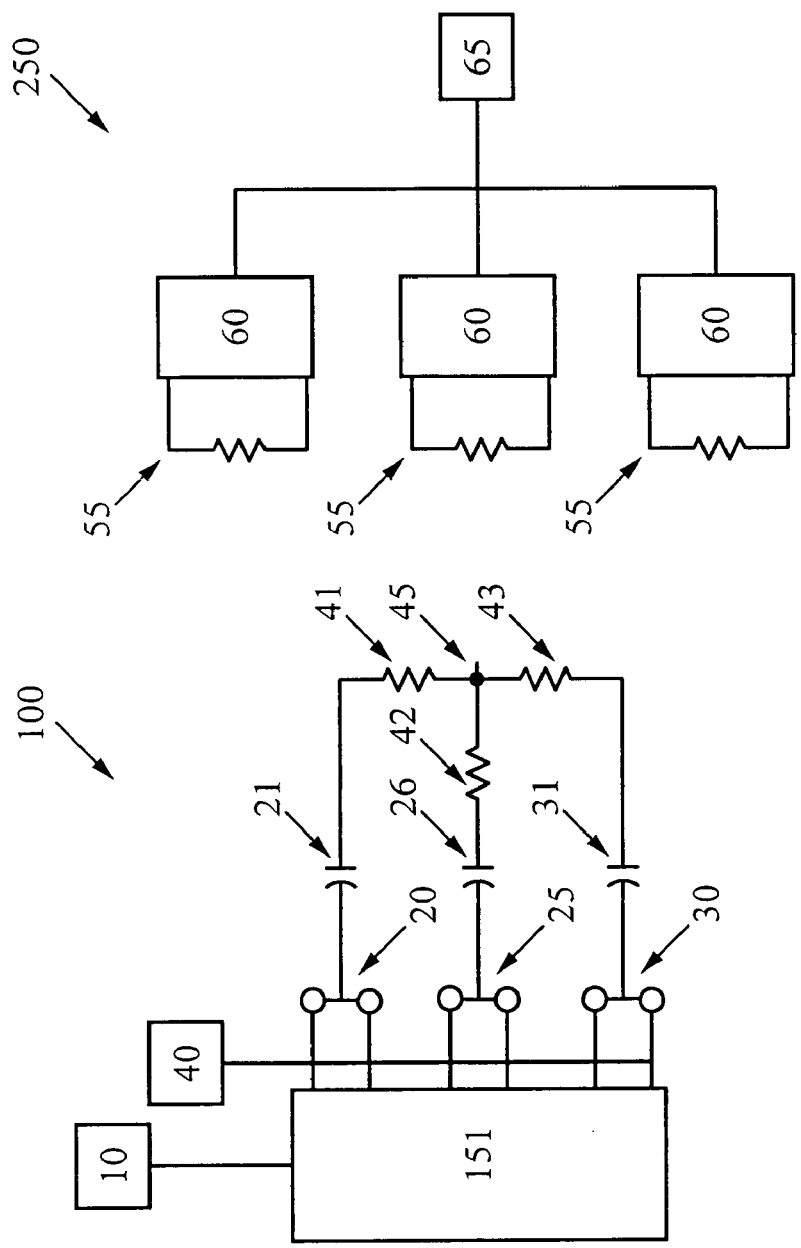
FIG. 1C is a schematic diagram of another alternative contactless energy transmitter of the present invention.

FIG. 1C is an alternative schematic diagram of some embodiments of the present invention. In FIG. 1C, a number of reception antennas 55 are used in the receiver 250. In this embodiment the need to carefully align the receiver with the energy transmitter 100 is avoided. This is due to the fact that a high magnetic flux density is created by employing a large number of reception antenna 55 with small induction coils to create a strong electromagnetic field in a wide range of directions.

Figure 2A:
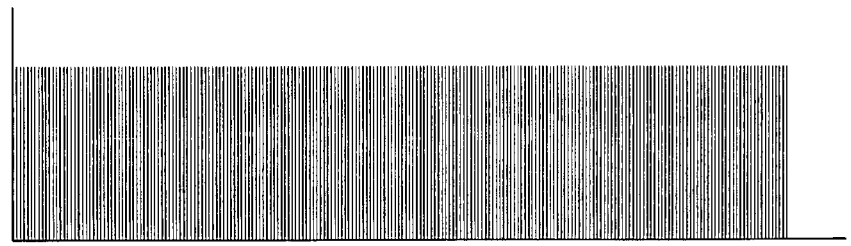
FIG. 2A illustrates the operating frequency of the present invention.
Figure 2B:
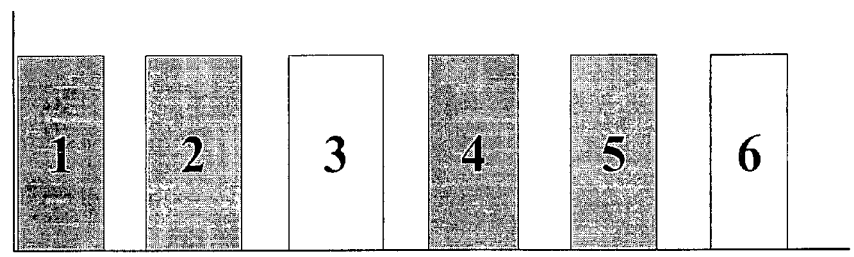
FIG. 2B illustrates the packet bursts produced by the transistors of the present invention which are used to modulate the operating frequency.
Figure 2C:
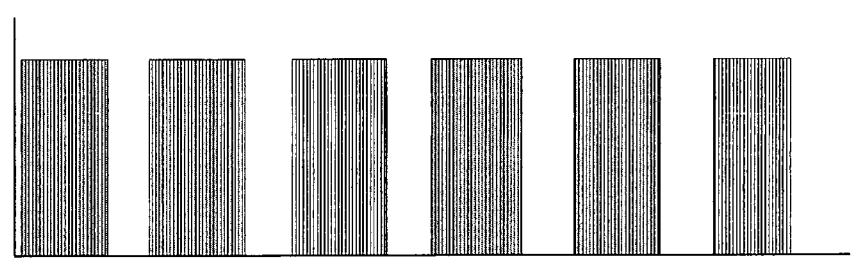

FIGS. 2A, 2B and 2C illustrate the modulation technique of the present invention. FIG. 2A represents the high operating frequency produced by the transmitter. As shown, the signal is monotonal and is a comprised of a high frequency $\omega_{high}$. FIG. 2B represents a square wave produced by the operation of regularly turning on and off the transistor pairs 20, 25 and 30 as illustrated in FIG. 1B. As shown, pulses 1 and 4 are produced when the complementary transistors 20 are turned on and off, pulses 2 and 5 are produced when the complementary transistors 25 are turned on and off and pulses 3 and 6 are produced when the complementary transistors 30 are turned on and off. The resulting waveform is a square wave with frequency $\omega_{square}$.

Finally, FIG. 2C shows the high frequency signal with frequency $\omega_{high}$ as illustrated in FIG. 2A modulated by the square wave with frequency $\omega_{square}$ as illustrated in FIG. 2B. Because the signal produced by the multi-phase transmitter 15 only passes through a pair of transistors when that pair is "on", the square wave houses the high frequency wave. The resulting waveform shown in FIG. 2C having a frequency $\omega_{mod}$ and comprises a pulse train with a low frequency housing a high frequency signal.

Figure 3A:
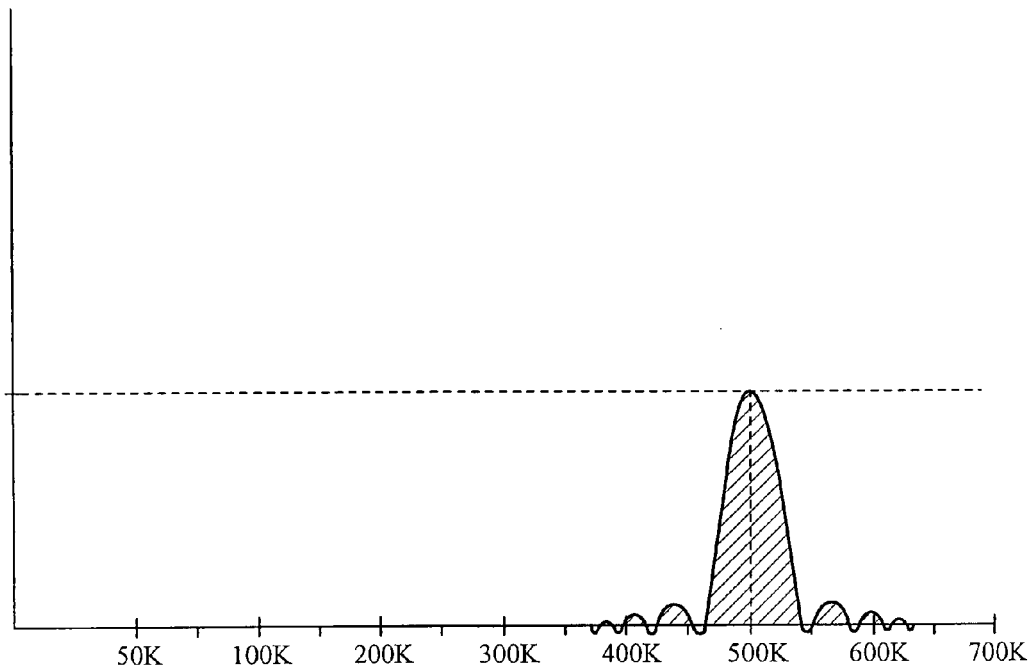
FIG. 3A is a graph showing a power distribution resulting from an unmodulated transmission.
Figure 3B:
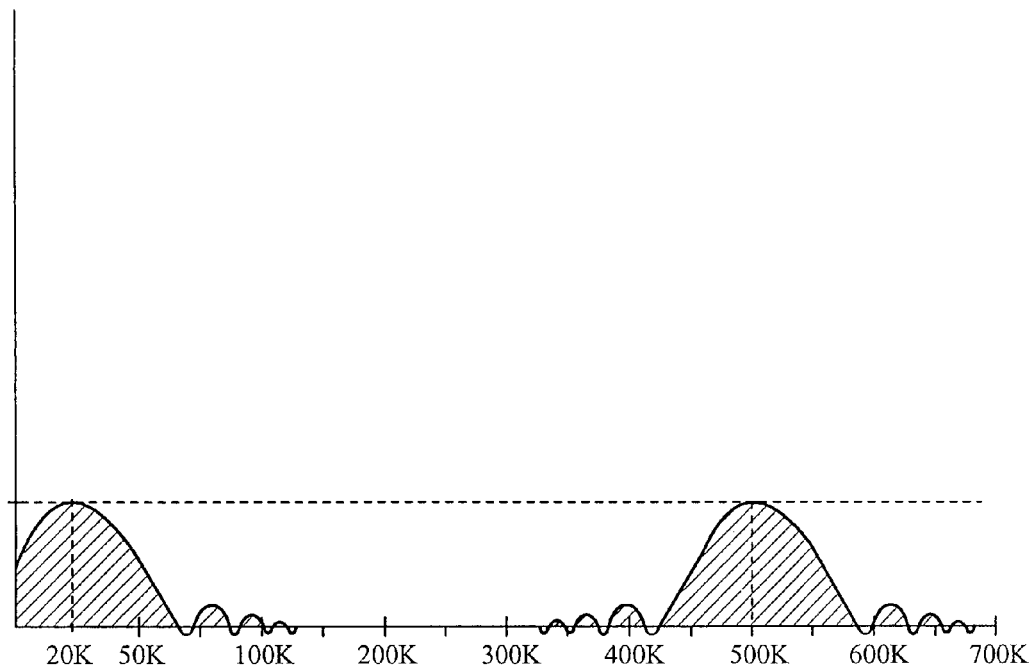
FIG. 3B is a graphical illustration of the effect of modulating the operating frequency with a lower frequency pulse train on the power distribution.
Figure 3C:
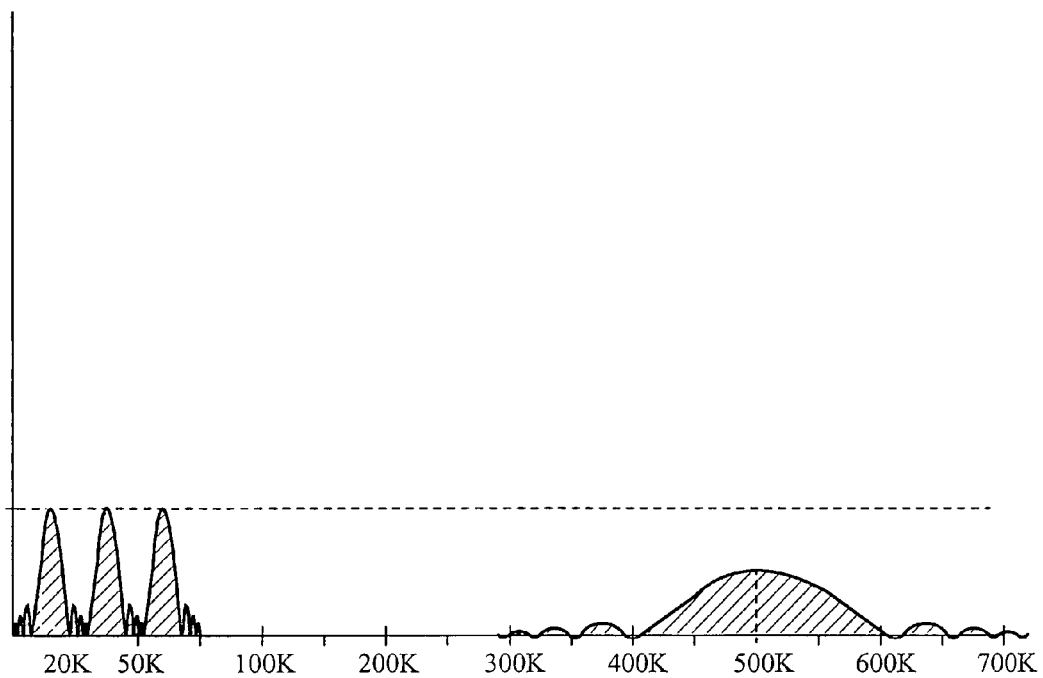
FIG. 3C is a graphical illustration of the effect of modulating the operating frequency with a randomly generated low frequency pulse train on the power distribution.

The modulation of the signal transmitted by the multi-phase transmitter 15 effects the power distribution of the signal as shown in FIGS. 3A-3C. FIG. 3A is a graph showing a power distribution resulting from an unmodulated high frequency transmission. As shown, the signal is a 500 Khz transmission signal.

FIG. 3B is a graphical illustration of the effect on the power distribution from modulating the operating frequency with a lower frequency pulse train. As shown, the modulation frequency is 20 Khz. The modulation results in EMI being reduced and spread out over a wider range of frequencies as shown by the small peak of EMI around the modulation frequency of 20 Khz and the smaller and more widely dispersed amount of energy around the 500 Khz peak. The EMI radiated by the system occurs over a larger range of frequencies, but is weaker and less of a problem.

Referring back to FIG. 1B, and as explained above, the multi-phase transmitter 151 is able to be configured to transmit a dynamic frequency $\omega_{high}$ that is predetermined within a given range. Although the continuous change can be predetermined, it is preferably random or alternatively pseudo-random. By way of example, the frequency $\omega_{high}$ can be any frequency between 400 and 600 KHz and the transistors 20, 25 and 30 can be turned on and off in randomly varying intervals between 10 and 50 KHz.

FIG. 3C is a graphical illustration of the effect of modulating the operating frequency with such a randomly generated lower frequency on the power distribution. It can be appreciated that the amount of energy within the two signals is the same as seen in FIGS. 3A and 3B, but spread out over a wider frequency band. The end result is further suppression of EMI.

Figure 4:
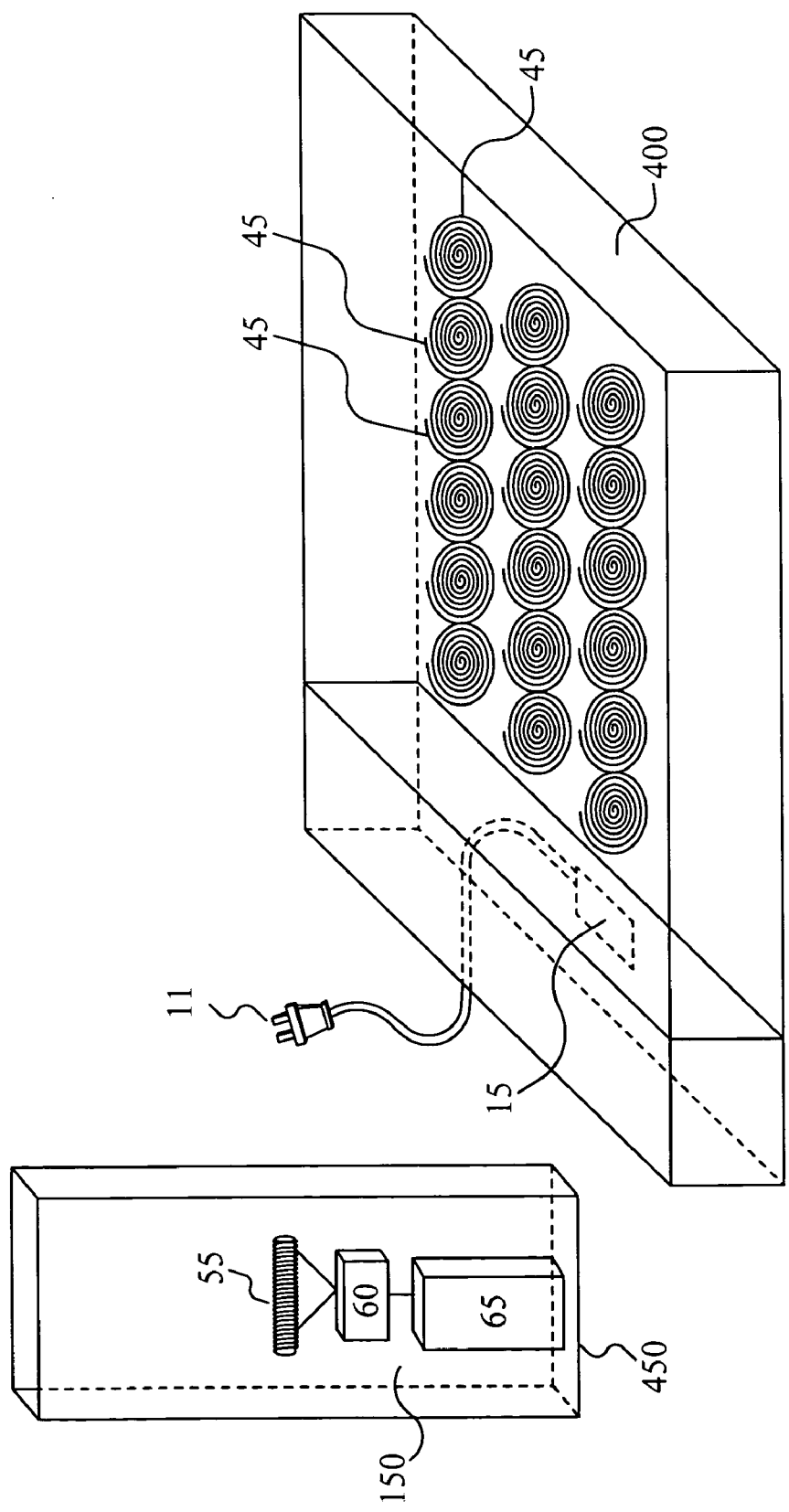
FIG. 4 illustrates one embodiment of the contactless energy transmitter of the present invention.

FIG. 4 illustrates a practical implementation of the contactless energy transmission converter according to some embodiments of the present invention. In FIG. 4, the multi-phase transmitter 15 is shown housed in charging pad 400. The multi-phase transmitter is coupled to a standard plug 11, which is configured to plug into a standard 120 or 240 volt power source. Pairs of complementary transistors (not shown) are located beneath a matrix of antennas 45. The receiver 150 is shown housed in a target device 450. The reception antenna 55 are coupled to DC-Converter 60 which converts the signal into a DC current. The DC current is then used to charge a battery 65. In one particular embodiment of the present invention, the target device 450 is a television remote control.

In other embodiments, multiple devices (not shown), each having a receiver antenna 55 are able to be charged on the charging pad 400. The multiple devices do not need a particular orientation because each receiver antenna 55 will be in close enough proximity to at least one antenna 45 in the matrix of antennas for effective transmission.

Furthermore, the embodiment illustrated in FIG. 4 helps eliminate the requirement for precise orientation of inductors required in known wireless energy transfer solutions. In some applications, power is able to transferred through inductive coupling, but only when the transmitting antenna and the receiver antenna are perfectly aligned. Such precise alignment can be inconvenient in certain applications. For instance, using inductance to power a wireless mouse by placing a single receiver antenna in the mouse and a transmitting antenna in the mouse pad would not work effectively if the mouse needed to be precisely aligned on top of the one particular transmitting antenna because, by its nature, a mouse is mobile. Extended use of the mouse or misalignment would lead to a drained battery.

Figure 5:
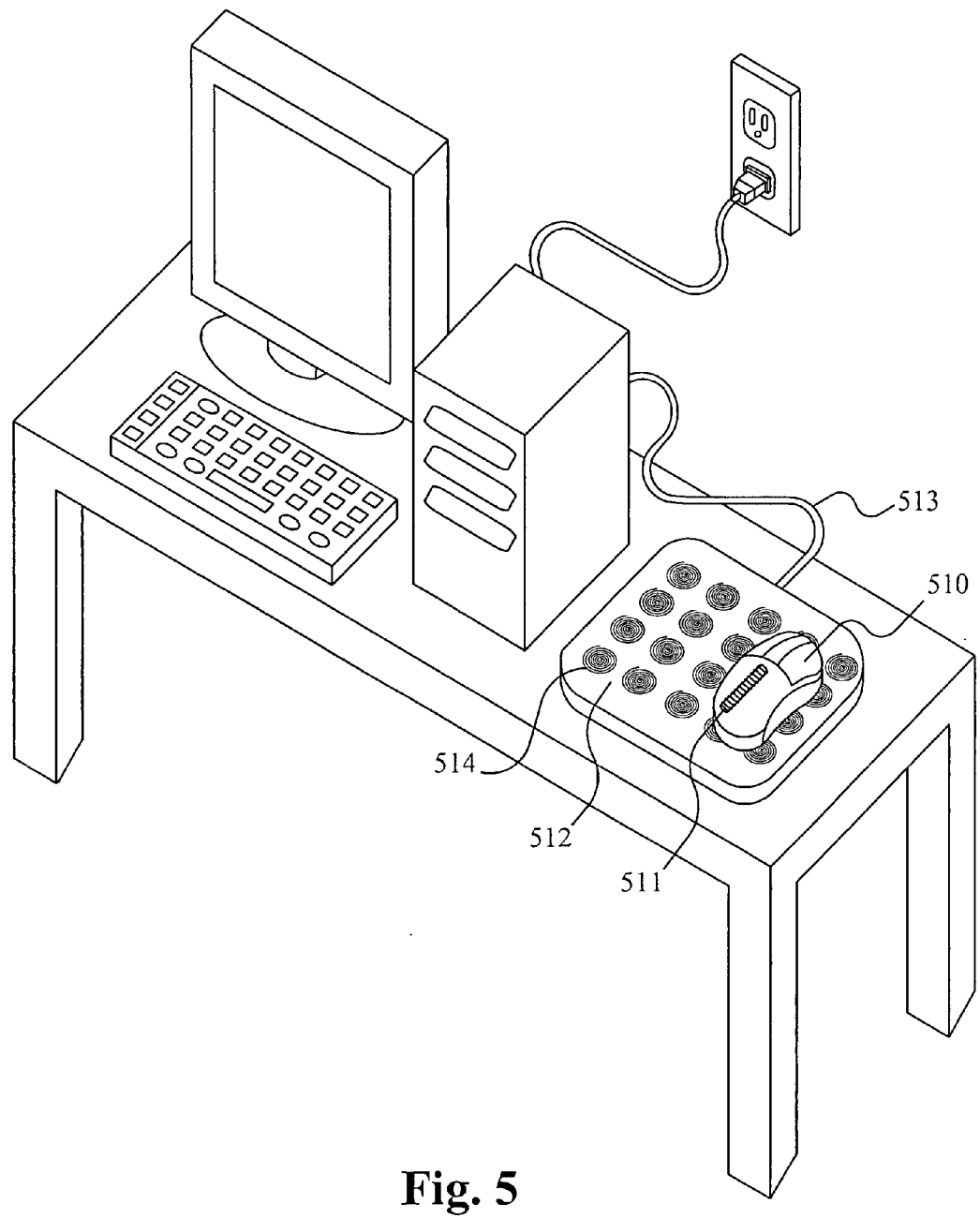
FIG. 5 illustrates a computer and computer mousepad implementing the contactless energy transmitter of the present invention for use with a wireless mouse.

FIG. 5 illustrates another practical manifestation of the present invention. FIG. 5 illustrates an inductive computer mouse pad 512 with an array of transmitters, of which transmitter 514 is an exemplary transmitter within the array of transmitters, and a target receiver with induction coil 511 in a wireless computer mouse 510. For convenience, power could be provided to the mouse pad 512 by a USB cable 513 plugged into a USB port. Alternatively, the mouse pad 512 can be plugged into a wall socket. According to this embodiment, the battery in a wireless mouse is able to be constantly charged so long as the mouse pad 513 is plugged in and the mouse 510 is on the mouse pad 512.

Figure 6:
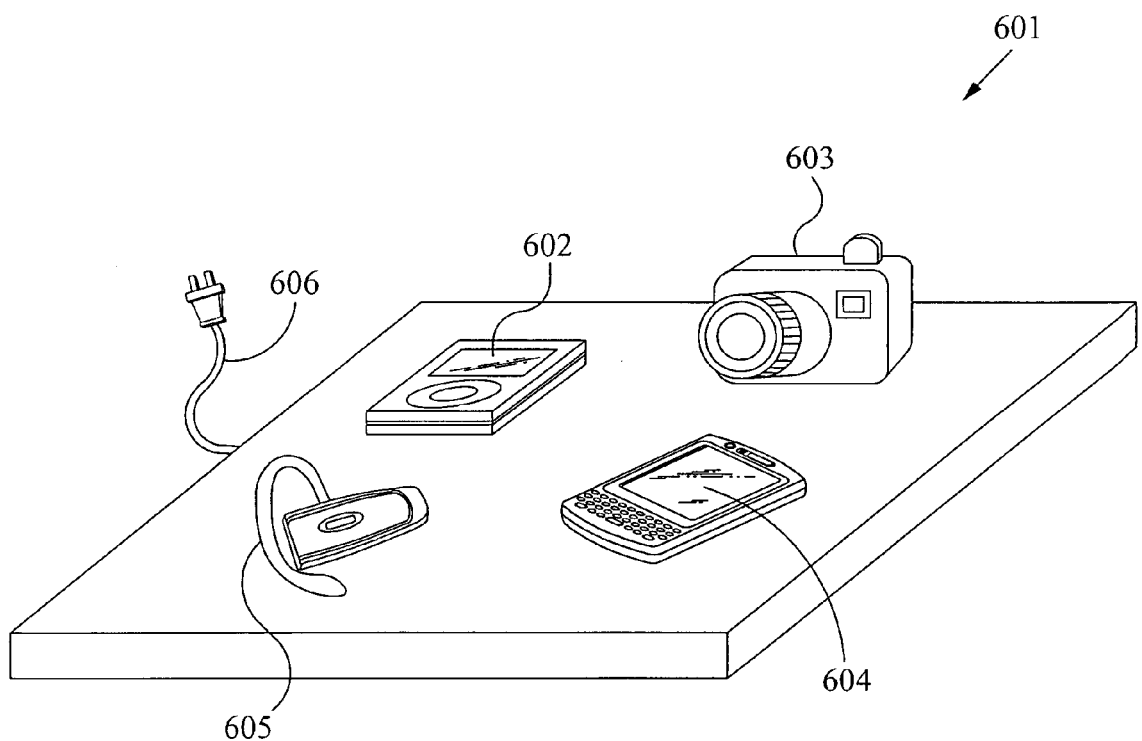

FIG. 6 illustrates another practical manifestation of the present invention. FIG. 6 illustrates an inductive charging device 601 with an array of transmitters (not shown) located within the charging device 601 and a number of consumer electronic devices 602, 603, 604, 605 target devices placed upon the charging device 601. Although particular types of consumer electronics devices are shown, it will be readily apparent to those having ordinary skill in the art that other types of consumer electronic devices are similarly able to be charged using the device of the present invention. In some embodiments of the present invention, power is provided to the charging device 601 by a wire 606 plugged into a wall socket (not shown). In other embodiments, a USB cable plugged into a USB port of a powered computer (not shown) is able to supply adequate power to the charging device 601. According to this embodiment of the present invention, each device 602, 603, 604, 605 contains a receiver with induction coil (not shown). In some embodiments of the present invention the receiver with induction coil is equipped within the devices 602, 603, 604, 605 after market. In other embodiments, the receiver with induction coil in integrally formed within the devices 602, 603, 604, 605 at the time of manufacture. According to this embodiment, power is supplied to the devices 602, 603, 604, 605 wirelessly from the charging device 601. As such, a user is able to place any enabled device upon the charging device 601 to charge the device without concern for its alignment upon the surface.

As described, the present invention solves some of the problems present in existing inductance systems. The present invention provides a practical way to transfer a useful amount of power wirelessly without requiring precise orientation of antennas and without emitting too much electromagnetic interference.

The present application has been described in terms of specific embodiments incorporating details to facilitate the understanding of the principles of construction and operation of the power amplification circuit. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A wireless energy transmission system comprising:
   a charging device configured to simultaneously charge a plurality of types of electronic devices, the charging device comprising:
      a signal generator for generating a signal at a first frequency;
      at least one controllable field-effect transistor pair for receiving the signal at a first frequency, wherein the at least one controllable field-effect transistor pair is alternatively turned on and off, forming multiple carrier frequencies, wherein the first frequency is modulated by the multiple carrier frequencies, forming multiple modulated signals; and
      at least one inductive coil transmission antenna for receiving the multiple modulated signals, forming a transmission signal; and
   at least one electronic device comprising:
      at least one inductive coil receiver antenna for receiving the transmission signal, forming a received signal; and
      a receiver circuit for converting the received signal into a current.

2. The wireless energy transmission system according to claim 1, wherein the first frequency is 500 Kilohertz.

3. The wireless energy transmission system according to claim 1 wherein the at least one controllable field-effect transistor pair is a Metal-Oxide-Semiconductor Field-Effect Transistor pair.

4. The wireless energy transmission system according to claim 1 wherein the at least one controllable field-effect transistor pair is a Junction Field-Effect Transistor pair.

5. The wireless energy transmission system according to claim 1, wherein the at least one controllable field-effect transistor pair is controlled by a computer.

6. The wireless energy transmission system according to claim 1, wherein at least one of the carrier frequencies formed by the at least one controllable field-effect transistor pair is a square wave pulse train.

7. The wireless energy transmission system according to claim 6, wherein the square wave pulse train has a wavelength of 20 Kilohertz.

8. The wireless energy transmission system according to claim 1, wherein at least one of the carrier frequencies formed by the at least one controllable field-effect transistor pair is a dynamic carrier frequency.

9. The wireless energy transmission system according to claim 8, wherein the dynamic carrier frequency is tunable.

10. The wireless energy transmission system according to claim 1, wherein at least one of the carrier frequencies formed by the at least one controllable field-effect resistor is randomly generated by a random frequency generator.

11. The wireless energy transmission system according to claim 10, wherein the random frequency generator generates frequencies of 50 Kilohertz or less.

12. The wireless energy transmission system according to claim 1, wherein more than one controllable field-effect transistor pairs receives the signal at the first frequency forming the multiple carrier frequencies.

13. The wireless energy transmission system according to claim 1, wherein the current charges at least one battery cell.

14. The wireless energy transmission system according to claim 12, wherein each inductive coil transmission antenna receives a particular signal from the multiple modulated signals, and wherein the transmission signal comprises signals from each inductive coil transmission antenna.

15. An apparatus for wireless charging of a battery cell comprising:
   a charging device configured to simultaneously charge a plurality of types of electronic devices, the charging pad comprising:
      a signal generator for generating a signal at a first frequency;
      at least one controllable field-effect transistor pair for receiving the signal at a first frequency, wherein the at least one controllable field-effect transistor pair is alternatively turned on and off, forming multiple carrier frequencies, wherein the first frequency is modulated by the multiple carrier frequencies, forming multiple modulated signals;
      at least one transmission antenna for receiving the multiple modulated signals, forming a transmission signal; and
      a power source for delivering current to the signal generator; and
   at least one electronic device comprising:
      rechargeable battery cells;

at least one receiver antenna for receiving the transmission signal, forming a received signal; and a receiver circuit for converting the received signal into a current, wherein the current recharges the rechargeable battery cells.

16. The apparatus for wireless charging of a battery cell according to claim 15, wherein the charging device is a mouse pad, and wherein the at least one electronic device is a wireless optical mouse.

17. The apparatus for wireless charging of a battery cell according to claim 15, wherein the charging device is a tabletop charging pad, and wherein the at least one electronic device is a remote control.

18. The apparatus for wireless charging of a battery cell according to claim 15, wherein the at least one electronic device is placed on the charging device.

19. A method of wireless power transfer comprising:
producing a first current in a frequency generator of a charging device configured to simultaneously charge a plurality of types of electronic device, forming a first frequency;
directing the first frequency to at least one controllable field-effect transistor pair;
alternatively turning the at least one controllable field-effect transistor pair on and off, forming multiple carrier frequencies, wherein the first frequency is modulated by the multiple carrier frequencies, forming multiple modulated signals;
directing the multiple modulated signals to at least one transmitter antenna of the charging device, wherein the at least one transmitter antenna produces a transmission signal;
positioning at least one receiver antenna of an electronic device in proximity to the transmitter antenna, wherein the receiver antenna picks up the transmission signal, forming a received transmission; and
converting the received transmission into a second current.

20. A method of transmitting electrical energy inductively from a first device to a second device comprising:
positioning a charging device configured to simultaneously charge a plurality of types of electronic devices, the charging pad having a transmitter, wherein the transmitter transmits a signal by:
producing a first current in a frequency generator, forming a first frequency;
directing the first frequency to at least one controllable field-effect transistor pair;
alternatively turning the at least one controllable field-effect transistor pair on and off, forming multiple carrier frequencies, wherein the first frequency is modulated by the multiple carrier frequencies, forming multiple modulated signals; and
directing the at least one modulated signals to at least one transmitter antenna, wherein the at least one transmitter antenna produces the transmission signal; and
positioning at least one target device in proximity to the charging device wherein at least one receiver antenna picks up the transmission signal from the at least one transmitter antenna, forming a received transmission;
converting the received transmission into a second current; and
using the second current to charge a battery cell in the at least one target device.

21. The wireless energy transmission system according to claim 1, wherein the signal generator is a multiphase transmitter that is coupled to the at least one controllable field-effect transistor pair.

22. A wireless energy transmission system comprising:
a charging device configured to simultaneously charge a plurality of types of electronic devices, the charging device comprising:
a signal generator for generating a signal at a first frequency;
a plurality of controllable field-effect transistor pairs for receiving the signal at a first frequency to form multiple carrier frequencies, wherein the first frequency is modulated by the multiple carrier frequencies, forming multiple modulated signals; and
at least one inductive coil transmission antenna for receiving the multiple modulated signals, forming a transmission signal; and
at least one electronic device comprising:
at least one inductive coil receiver antenna for receiving the transmission signal, forming a received signal; and
a receiver circuit for converting the received signal into a current.

* * * * *